Nov. 7, 1950   C. R. SLATER   2,529,358
COTTON STALK CUTTER WITH ROTARY CUTTING REELS
Filed Jan. 14, 1947   3 Sheets-Sheet 1
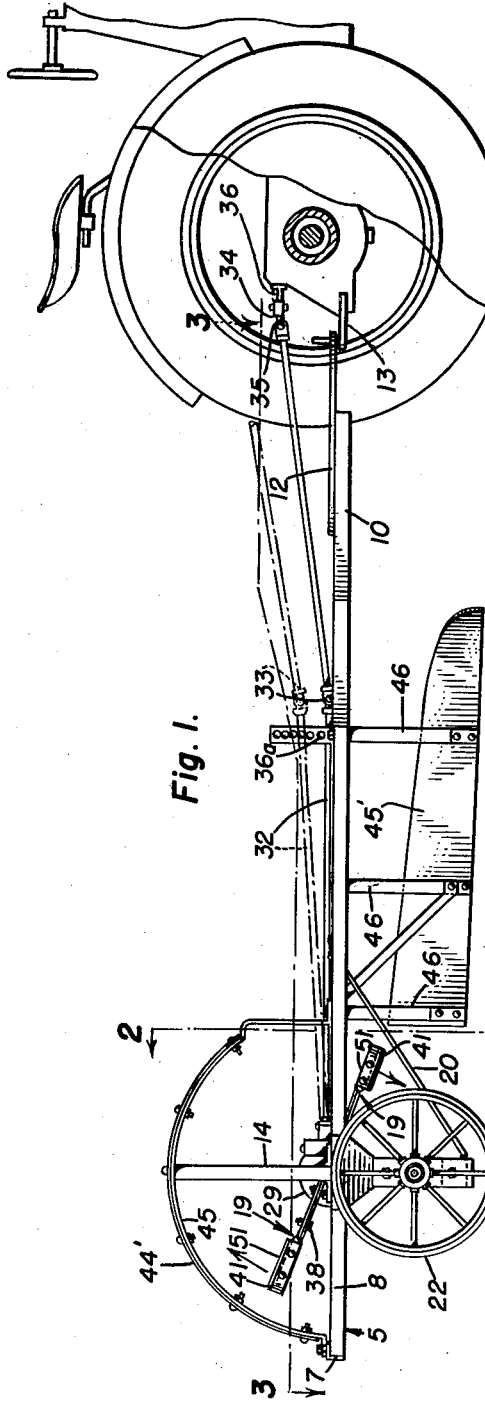
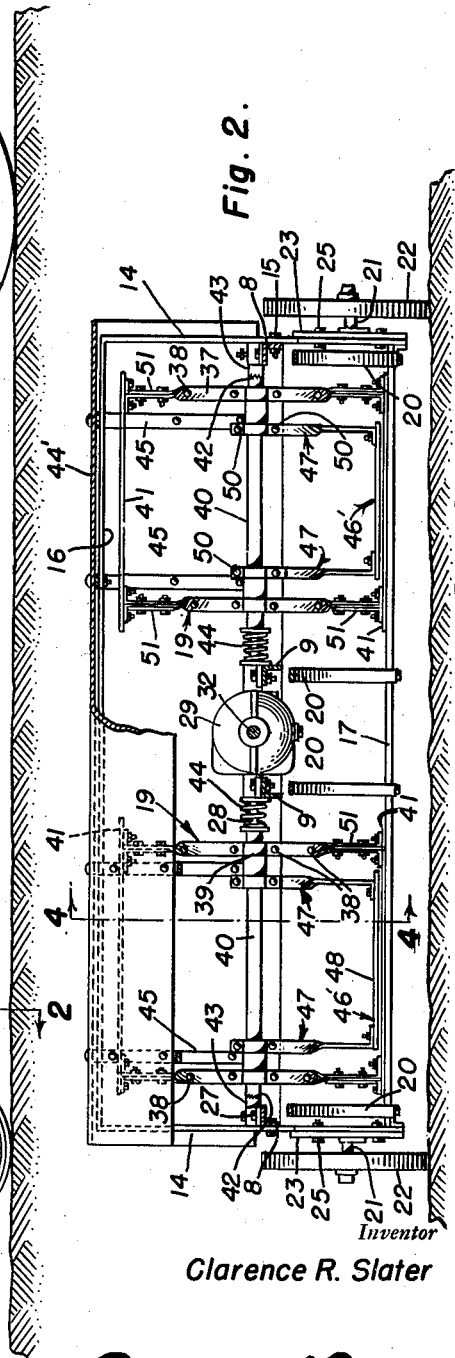
Inventor
Clarence R. Slater
By *Clarence A. O'Brien and Harvey B. Jacobson*
Attorneys

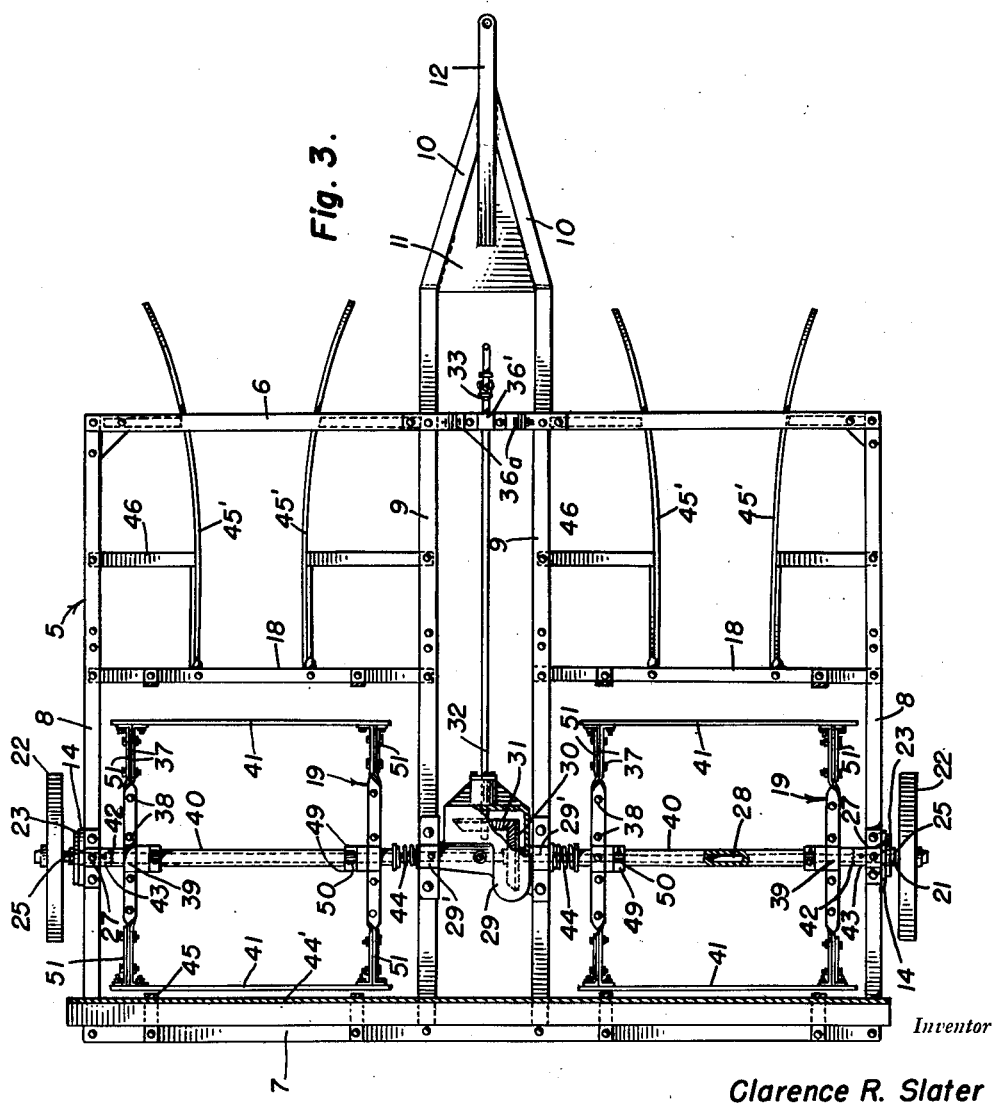

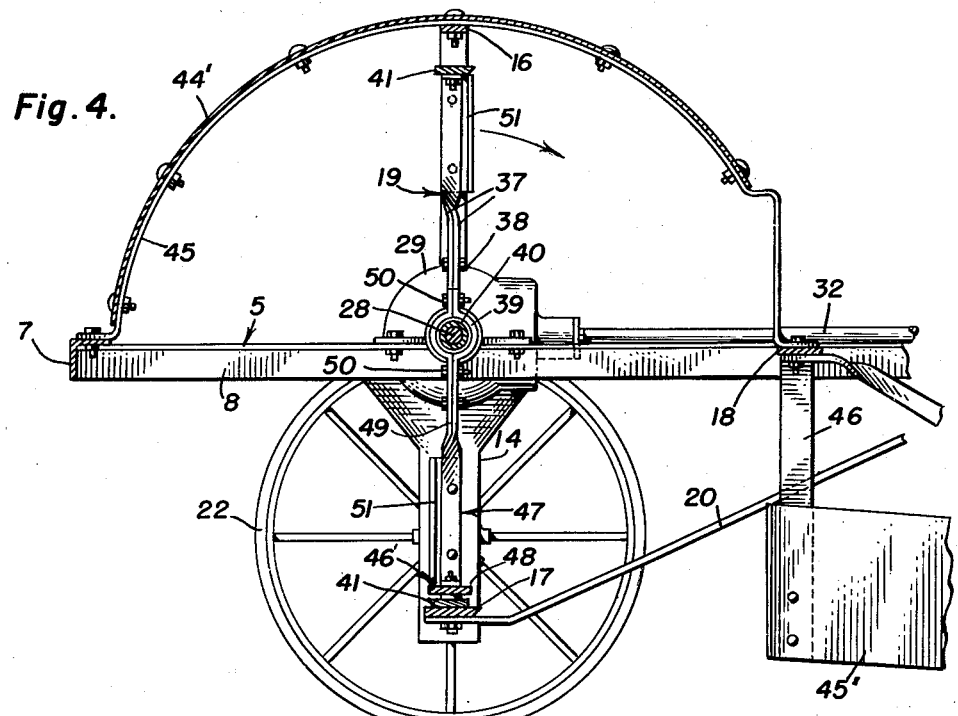
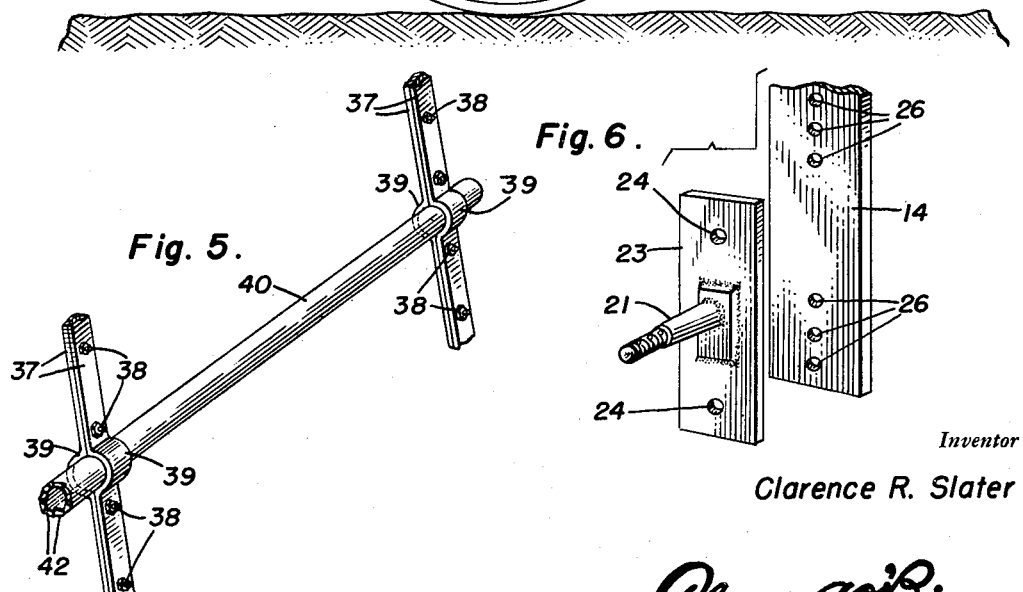

Patented Nov. 7, 1950

2,529,358

UNITED STATES PATENT OFFICE 2,529,358

COTTON STALK CUTTER WITH ROTARY CUTTING REELS

Clarence R. Slater, Lewisville, Tex., assignor of forty-nine per cent to John W. Slater, Lewisville, Tex.

Application January 14, 1947, Serial No. 721,928

4 Claims. (Cl. 56—249)

1

The present invention relates to two-row cotton stalk cutters of the type which are adapted to travel along the rows, and which include a plurality of spaced rotary cutting reels.

An object of the present invention is to provide an improved cotton stalk cutter of the above type which is adapted to be drawn by a tractor, and which is adapted to have the cutting reels thereof driven by the power take-off shaft of said tractor.

Another object of the invention is to provide pendulum weighting elements for the machine which are suspended within the cutting reels so as to clear the blades of trash.

A further object is to provide means whereby the cutting reels may only be driven in one direction.

Still another object is to provide means for vertically adjusting the frame and the cutting reels of the machine relative to the ground wheels and their axles, so as to set the reels for cutting the stalks at the desired distance above the ground surface.

A still further object of the invention is to provide a cotton stalk cutter of the above kind which is comparatively simple and durable in construction, highly efficient in operation, and otherwise well adapted to meet with the requirements for successful commercial use.

The exact nature of the present invention, as well as more specific objects and features thereof, will become apparent from the following description when considered in connection with the accompanying drawings, in which:

Figure 1 is a side elevational view of a cotton stalk cutter constructed in accordance with the present invention and showing the same as it appears in use;

Figure 2 is a transverse section taken on line 2—2 of Figure 1, with the reel cover partly broken away and in section;

Figure 3 is a horizontal section taken on line 3—3 of Figure 1;

Figure 4 is an enlarged vertical longitudinal section taken on line 4—4 of Figure 2;

Figure 5 is a fragmentary perspective view showing the hub and adjacent parts of one of the cutting reels; and, Figure 6 is an exploded perspective view drawn on an enlarged scale and showing details of the means for securing vertical adjustment of the chassis frame of the machine relative to the ground wheel axles.

Referring in detail to the drawings, the present cotton stalk cutter includes a horizontal rectangular chassis frame 5 composed of a front rail 6, a rear rail 7, and side rails 8. Midway between the side rails 8, the front rail 6 and the rear rail 7 are connected by a pair of spaced longitudinal bars 9 which project forwardly beyond the front rail 6 and terminate in forwardly converging front ends 10 that are connected by gusset plate 11. A tongue 12 is attached to the forward ends of bars 9 and to gusset plate 11 to facilitate coupling of the machine to the tractor drawbar indicated by dotted lines at 13 in Figure 1.

Mounted in the rear portion of chassis frame 5 is a second vertical frame composed of uprights 14 which are attached at 15 and intermediate their ends to the side rails 8, and which are connected at their upper ends by a top connecting member 16. At their lower ends, the uprights 14 are connected by a transverse stationary cutter blade 17 which may be similar to the stationary cutter blade commonly employed on an ordinary lawn mower of the rotary cutting reel type. Each side rail 8 is perferably connected to the nearest longitudinal bar 9 by a cross bar 18 which is located forwardly of a rotary cutting reel 19. At points between and at its ends, the stationary cutter blade 17 is braced against longitudinal strains by means of inclined braces 20 attached at their rear lower ends to the blade 17 and at their forward upper ends to the side rails 8 and longitudinal bars 9. The lower end portions of the uprights 14 are widened and have the stub axles 21 of co-axial ground wheels 22 secured thereto for relative vertical adjustment so that the height of the blade 17 or the distance of the latter above the ground surface may be varied to thereby regulate the distance above the ground surface at which the stalks are cut by the reels 19. As shown, each stub axle 21 is rigid with and projects outwardly from a vertical attaching plate 23 having holes 24 for reception of bolts 25 by means of which the axles 21 are rigidly secured to the uprights 14. Also, the uprights 14 have two vertical series of holes 26 for selective reception of the bolts 25 whereby the relative adjustment between the axle 21 and the uprights 14 may be secured.

Journaled transversely of the rear portion of frame 5 in bearings 27 secured upon the side frame rails 8, is a shaft 28 on which the cutting reels 19 are mounted, said reels being adapted to be driven with shaft 28 and capable of limited lateral movement thereon. Each reel is located in the space between a longitudinal bar 9 and the adjacent side rail 8 and between the cross bar 18 and the rear frame rail 7. Journaled in bearings 29' upon and spanning the space between the longitudinal bars 9 is a gear casing 29 through which the shaft 28 extends, a bevel gear 30 being secured on the shaft 28 within the casing 29 and meshing with a second bevel gear 31 secured on the rear end of a countershaft 32 that extends forwardly from the casing 29 and includes sections jointed at 33 by means of a universal joint. A stub shaft 34 is coupled to the forward end of shaft 32 by a universal joint 35 and is adapted to be connected or coupled to the power take-off shaft 36 of the tractor for being driven thereby. By this means, power is transmitted from the power take-off shaft of the tractor to the cutting reels 19 for driving the latter in a clockwise direction as viewed in Figure 1 and as indicated by the arrows in said figure. The forward portion of the rear section of shaft 32 is journaled in a bearing 36' which is mounted at 36a for vertical adjustment so as to facilitate proper connection of shaft 32 to tractor power take-off shafts located at different heights.

Each cutting reel 19 comprises pairs of oppositely projecting spokes each composed of two bars 37 bolted together at 38 and formed intermediate their ends with mating corrugations 39 which receive and are secured to an end portion of a tubular hub 40, the outer ends of the spokes being connected by transverse cutter blades 41. The hubs 40 of the reels 19 are slidably mounted on the shaft 28 as previously indicated. The outer end of each reel hub 40 is formed with ratchet teeth 42 for cooperating with the ratchet teeth of a collar 43 secured on the adjacent end portion of shaft 28. The teeth 42 of the hub of each cutting reel are yieldingly engaged with the teeth of the associated collar 43 by means of a helical compression spring 44 which urges the reel toward said collar 43 and is placed on the shaft 28 between the inner end of each reel hub 40 and gear casing 29. In other words, a spring 44 yieldingly shifts each cutting reel laterally outwardly to engage the teeth 42 with those of the collar 43. The arrangement is such that power is transmitted from shaft 28 to each cutting reel so as to drive the latter only in the direction of the arrows in Figure 1, the ratchet driving connections permitting the reels to remain still or idle in case the shaft 28 is driven in an opposite direction. This permits manual turning of the reels in a counter-clockwise direction as viewed in Figure 1 in case plants should become entangled in the cutting reel or an obstacle should become lodged between a blade of either cutting reel and the stationary blade 17.

A convex segmento-cylindrical cover or guard canopy 44' is provided over the cutting reels, and this cover or canopy is supported by means of longitudinally arranged bows 45 attached to the cross bar 18 and the rear rail 7 of the frame 5.

The plants to be cut are effectively guided to the respective cutting reels by means of a pair of spaced gathering plates 45' mounted in front of each reel and having forwardly diverging ends. These gathering plates are vertically supported in spaced relation by means of suitable attaching brackets 46 which are secured to the frame 5 at their upper ends and to the gathering plates 45' at their lower ends.

Pendulum weighting and blade clearing elements are freely suspended within the cutting reels as at 46', one of said elements being arranged within each reel. As shown, each weighting element comprises a pair of hangers 47 loosely embracing the hub 40 of the associated reel at their upper ends and connected at their lower ends by a transversely disposed elongated weight bar 48. Each hanger 47 preferably consists of a pair of bars 49 bolted together at 50 to form a collar loosely embracing the associated reel hub 40, one bar 49 being longer than the other and attached at its lower end to an end of the associated weighting bar 48. Obviously, by placing additional weighting bars upon and securing the same to the weighting bars 48, the weight of the rear portion of the machine may be increased, the purpose being to provide means to prevent vertical jiggering of the rear end of the machine due to riding over obstructions and irregularities in the ground surface.

In order to cut leaning stalks, supplemental radial blades 51 are flatly secured to the outer sides of the outer portions of the reel spokes.

In practice, the machine is coupled to the drawbar of the tractor as shown in Figure 1, and stub shaft 34 is coupled to the power take-off 36 of the tractor. As the machine travels ahead, power is transmitted to the shaft 32 for driving the cutting reels in the direction of the arrows of Figure 1. As the cutting reels rotate, the blades 41 thereof intermittently coact with the stationary cutter blade 17 for cutting the stalks off adjacent the ground.

From the foregoing description, it is believed that the construction, operation and advantages of the present invention will be readily understood and appreciated by those skilled in the art. Modifications and changes in details of construction are contemplated, such as fairly fall within the scope of the invention as claimed.

What I claim is:

1. A cotton stalk cutter comprising a frame having wheels, a shaft journalled on said frame, means for driving said shaft, a cutting reel rotatably mounted on said shaft, a stationary cutter blade, means fastening said stationary cutter blade to said frame beneath said cutting reel, said stationary blade coacting with the blades of said cutting reel, a blade clearing element, and means rotatably mounting said blade clearing element about said shaft inside said reel.

2. A double row cotton stalk cutter comprising a frame having wheels attached thereto, a shaft journalled on said frame, means for driving said shaft, a pair of spaced rotary cutting reels rotatably mounted on said shaft within said frame, depending uprights fastened to and projecting below said frame, a stationary cutter blade secured to and extending between said uprights, said stationary cutter blade being disposed beneath said cutting reels, said stationary blade coacting with the blades of the cutting reels, blade clearing elements, and means mounting said blade clearing elements about said shaft inside said cutting reels.

3. A cotton stalk cutter comprising a frame having wheels secured thereto, a shaft journalled on said frame, means for driving said shaft, a cutting reel journalled on said shaft within the frame, driving connections between said shaft and the hubs of said reel, a stationary cutter blade, means fastening said stationary cutter blade to said frame beneath said cutting reel, said stationary cutter blade coacting with the blades of said cutting reel, a blade clearing element, and means rotatably mounting said blade clearing element about said shaft inside said reel, said last recited means including a pair of hangers each comprising a pair of bars secured to each other forming collars, said collars loosely embracing said hubs.

4. A double row cotton stalk cutter comprising a frame having wheels attached thereto, a shaft journalled on said frame, means for driving said shaft, a pair of spaced rotary cutting reels rotatably mounted on said shaft within said frame, depending uprights fastened to and projecting below said frame, a stationary cutter blade secured to and extending between said uprights, said stationary cutter blade being disposed beneath said cutting reels, said stationary blade coacting with the blades of the cutting reels, blade clearing elements, and means mounting said blade clearing elements about said shaft inside said cutting reels, said last recited means comprising a pair of hangers for each of said blade clearing elements, said hangers each comprising bars secured to each other forming collars, said collars being secured in a loosely embracing relationship with the hubs of said reels.

CLARENCE R. SLATER.

REFERENCES CITED

The following references are of record in the file of this patent:

UNITED STATES PATENTS

| Number | Name | Date |
| --- | --- | --- |
| 114,127 | Gatling | Apr. 25, 1871 |
| 372,858 | Lockwood | Nov. 8, 1887 |
| 467,022 | Rockey | Jan. 12, 1892 |
| 897,935 | Schwarz | Sept. 8, 1908 |
| 974,219 | Werner | Nov. 1, 1910 |
| 1,347,569 | Worthington | July 27, 1920 |
| 1,413,637 | Townsend | Apr. 25, 1922 |
| 1,650,991 | Knoerzer | Nov. 29, 1927 |
| 1,810,415 | Fortson | June 16, 1931 |
| 1,833,001 | Smith | Nov. 24, 1931 |
| 2,325,252 | Krenzke | July 27, 1943 |
| 2,465,405 | Strawn | Mar. 29, 1949 |